United States Patent
Knoch et al.

(10) Patent No.: US 8,265,438 B2
(45) Date of Patent: Sep. 11, 2012

(54) OPTICAL CABLE WITH STRANDED MICROMODULES

(75) Inventors: Horst Knoch, Coburg (DE); Gerhard Merbach, Neustadt bei Coburg (DE); Waldemar Stöcklein, Neustadt bei Coburg (DE); Günter Wünsch, Neustadt bei Coburg (DE)

(73) Assignee: CCS Technology, Inc., Wilmington, DE (US)

( * ) Notice: Subject to any disclaimer, the term of this patent is extended or adjusted under 35 U.S.C. 154(b) by 406 days.

(21) Appl. No.: 12/556,900

(22) Filed: Sep. 10, 2009

(65) Prior Publication Data

US 2010/0067856 A1  Mar. 18, 2010

(30) Foreign Application Priority Data

Sep. 12, 2008  (EP) .................................... 08164290

(51) Int. Cl.
*G02B 6/44* (2006.01)
*G02B 6/00* (2006.01)

(52) U.S. Cl. ....................... 385/111; 385/147

(58) Field of Classification Search ............... 385/100, 385/109, 111, 113
See application file for complete search history.

(56) References Cited

U.S. PATENT DOCUMENTS

| 4,909,593 | A | 3/1990 | Harbort et al. | 350/96.23 |
|---|---|---|---|---|
| 6,500,541 | B1 * | 12/2002 | Schoeck et al. | 428/372 |
| 6,584,251 | B1 * | 6/2003 | Ardouin | 385/100 |
| 7,174,076 | B2 * | 2/2007 | Park et al. | 385/103 |
| 7,292,757 | B2 * | 11/2007 | Rossi | 385/100 |
| 7,570,854 | B2 * | 8/2009 | Keller et al. | 385/110 |
| 2001/0021296 | A1 | 9/2001 | Nothofer | 385/109 |
| 2003/0118295 | A1 | 6/2003 | Lail et al. | 385/101 |
| 2003/0202758 | A1 * | 10/2003 | Ardouin | 385/111 |
| 2005/0196113 | A1 | 9/2005 | Hurley et al. | 385/109 |
| 2005/0265673 | A1 | 12/2005 | Mumm et al. | 385/100 |

FOREIGN PATENT DOCUMENTS

| EP | 1132761 | A2 | 9/2001 |
|---|---|---|---|
| EP | 1160163 | A2 | 12/2001 |
| EP | 1160606 | A2 | 12/2001 |
| WO | WO 2007/073386 | A1 | 6/2007 |

OTHER PUBLICATIONS

European Search Report, Dec. 18, 2008, 9 pages.

* cited by examiner

*Primary Examiner* — Akm Ullah
(74) *Attorney, Agent, or Firm* — Russell Scott Magaziner

(57) ABSTRACT

An optical cable comprises a plurality of elongate members wherein at least one of the elongate members include at least one optical fiber surrounded by buffer tube. The buffer tube is made of a soft material having a tension at break of less than 7.5 MPa. The elongate members are disposed around a central element. A binder is wrapped around the plurality of elongate members. An outer jacket surrounds the plurality of elongate members.

20 Claims, 4 Drawing Sheets

OPTICAL CABLE WITH STRANDED MICROMODULES

RELATED APPLICATIONS

This application claims the benefit of EP Application No. 08164290.2, filed Sep. 12, 2008, the entire contents of which are hereby incorporated by reference.

TECHNICAL FIELD

The present application relates to an optical cable comprising elongate members held in their position by a binder applied to the elongate members. The present application concerns also an apparatus to manufacture the optical cable.

BACKGROUND

Optical cables are used for transmitting information between an optical transmitter and a receiver station. The optical cable comprises elongate members disposed in a core section of the optical cable. In the embodiment of an optical cable at least one of the elongate members is formed as an optical transmission element. The optical transmission elements may be configured as a micromodule containing for example up to twelve optical fibers or even more which are protected by a polymeric material in the form of a tube. The micromodules are stranded around a central supporting element and fixed by a binder.

Conventional stranding techniques require rigid buffer tubes to avoid that the applied binder effects the attenuation of the fibers within the tube. However, optical transmission elements having such rigid polymer tubes require the use of special tools such as knifes or scissors to remove the buffer tube when optical waveguides housed by the buffer tube have to be exposed to connect the optical waveguides to a transmitter or receiver station.

There is a need to provide an improved fiber optic cable that allows an easy access to optical fibers housed in a buffer tube of an elongate member. There is also a need to provide an apparatus to manufacture an optical cable which allows an easy access to optical fibers of an elongate member. A further aspect of the invention relates to a method to manufacture the optical cable.

SUMMARY

An embodiment of an optical cable comprises a central element and a plurality of elongate members disposed around the central element. At least one of the elongate members comprises at least one optical fiber and a buffer tube. The buffer tube surrounds the at least one optical fiber and has a tension at break of less than 7.5 MPa. A binder is wrapped around the plurality of elongate members. An outer jacket surrounds the plurality of elongate members.

According to another embodiment of the optical cable the binder is wrapped around the plurality of elongate members with a tension of less than 2.5 N. The plurality of elongate members is stranded around the central element. The binder has for example a width between 1.0 mm to 3.0 mm. The binder may comprise a yarn of polyester.

A material of the buffer tube may comprise at least one or more of ethylene methyl acrylate, a material having flame retardant properties and a thermoplastic material. The buffer tube has an elongation at break between 120% and 160%. The buffer tube may have a thickness between 80 μm and 120 μm.

According to another embodiment of the optical cable the elongate members are stranded around the central element with a lay length between 60 mm and 120 mm in an SZ pattern. The binder is helically wound around the elongate members with a lay length between 20 mm and 30 mm.

The optical cable may comprise a tape disposed between the outer jacket and the elongate members. The tape is used as a thermal barrier layer to protect the soft material of the buffer tubes from melting and sticking together during extruding a cable jacket. The tape has for example a thickness between 0.05 mm to 0.1 mm. The tape may comprise a material of paper or polyester. The tape may also include a water swellable material to block a migration of moisture along the elongate members.

According to an embodiment of the optical cable the material of the outer jacket comprises a high density polyethylene material.

The central element of the optical cable comprises a rod of a glass reinforced polymer, a metal wire or an optical transmission element including optical fibers surrounded by a covering. The modulus of elasticity of the material of the covering is greater than the respective material of the buffer tube of the plurality of optical transmission elements. The central element may be covered by a sheath layer made of a thermoplastic or a water swellable material.

According to another embodiment of the optical cable each of the central element and the optical transmission elements have a diameter of 1.3 mm. The diameter of the optical cable may be less than 5.4 mm.

A further aspect is directed to a stranding apparatus to manufacture the optical cable. The stranding apparatus comprises a supply coil to store the binder, a flyer to draw the binder off from the supply coil, the flyer comprising a spring element. The binder is coupled to the spring element. The spring element is configured to exert a resetting force to the binder when the binder is drawn off from the supply coil. The binder is guided to a stranding device which may be formed as a stranding nipple to be applied to an elongate workpiece for example to a plurality of stranded elongate members such as optical transmission elements.

According to another embodiment of the stranding apparatus the stranding apparatus comprises a measuring probe to measure the tensile force exerted to the binder and a control device to control a rotational speed of the supply coil. The binder is fed from the supply coil to the measuring probe via the spring element. The control device controls the rotational speed of the supply coil such that the tensile force exerted to the binder is between 0.5 N and 2.5 N when the binder is drawn off from the supply coil.

According to another embodiment the stranding apparatus comprises an eyelet fixed to the flyer. The spring element comprises an eyelet to couple the binder to the spring element. The spring element is configured to exert the resetting force to the binder such that a path of the binder guiding from the eyelet to a rim of the flyer via the eyelet of the spring element is longer than the distance between the eyelet and the rim of the flyer.

The stranding apparatus may be formed as a reverse stranding apparatus wherein the measuring probe is disposed in relation to the supply coil such that the binder is fed from the supply coil to the measuring probe in a direction opposite to the direction in which the optical cable is fed when the binder is wound around the plurality of optical transmission elements of the optical cable.

A method to manufacture the optical cable comprises the steps of providing elongate members, at least one of the elongate members comprising at least one optical fiber and a buffer tube, the buffer tube surrounding the at least one optical fiber; disposing the elongate members around a central element; and wrapping a binder around the elongate members with a tensile force between 0.5 N and 2.5 N.

According to the method variations of the tensile force effected to the binder are compensated when the binder is wrapped around the elongate members.

According to another embodiment of the method a stranding apparatus comprises a supply coil to store the binder, a flyer to draw off the binder from the supply coil comprising a spring element and a measuring probe to measure the tensile force of the binder. The binder is fed from the supply coil to the measuring probe via the spring element. A resetting force is exerted to the binder when the binder is drawn off from the supply coil.

The spring element may be compressed to shorten the length of the path along which the binder is fed between the supply coil and the measuring probe to compensate variations of the tensile force becoming effective to the binder. The rotational speed of the supply coil is controlled in dependence on a force effected to the measuring probe when the tensile force of the binder is changed.

According to the method the buffer tubes may be provided with a tension at break of less that 7.5 MPa. The optical transmission elements may be surrounded by a thermal barrier layer. An outer sheath may be extruded around the thermal barrier layer.

DETAILED DESCRIPTION

Figure 1:
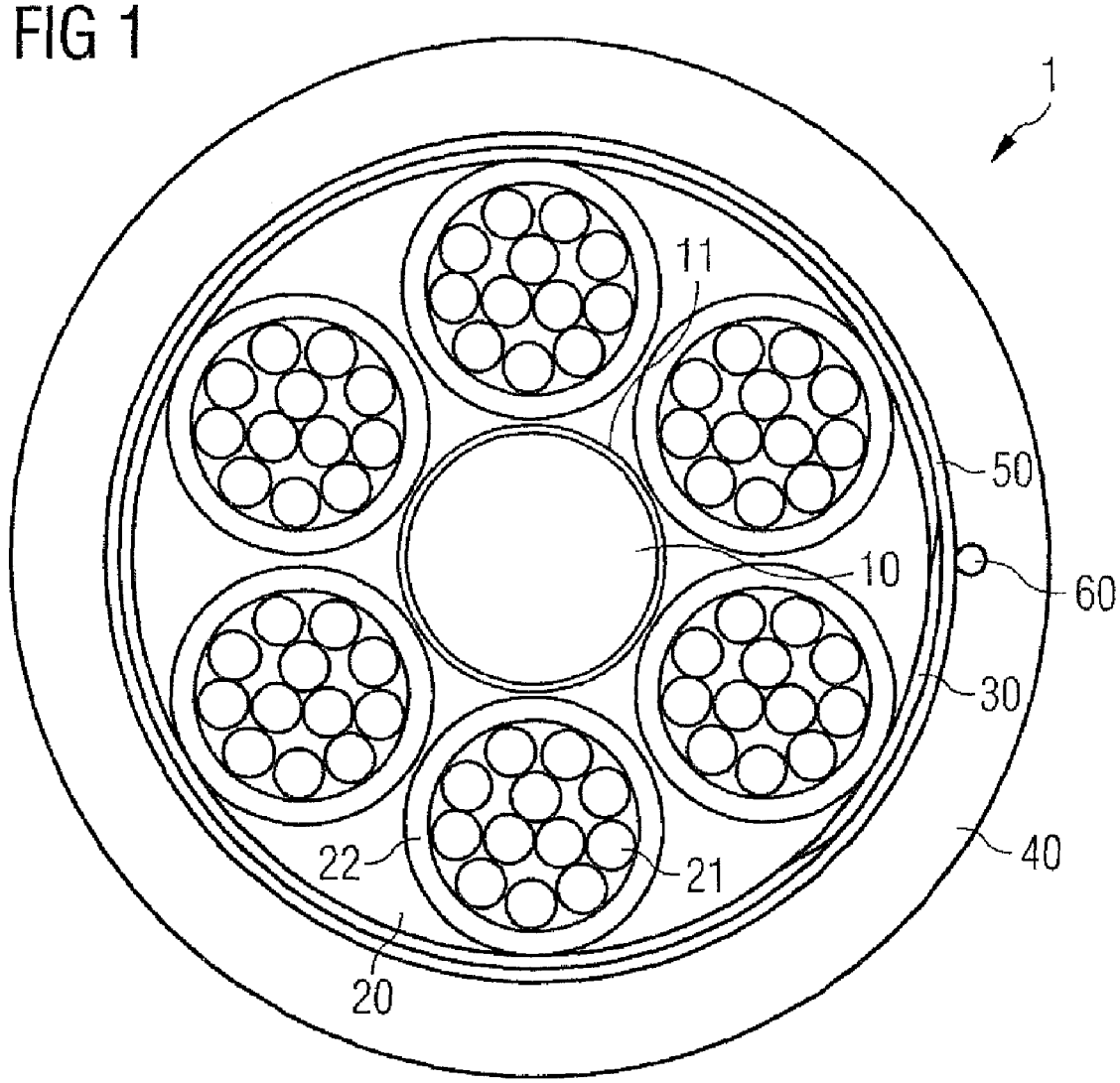
FIG. 1 shows an embodiment of an optical cable comprising stranded micromodules in a cross-sectional view.

FIG. 1 shows an optical cable 1 comprising a central element 10 and elongate members 20 disposed around the central element. The central element may be formed as a strength member, e.g. a rod made of a glass reinforced polymer (GRP) or a metallic wire. The strength member element 10 may be surrounded by a covering 11 comprising a thermoplastic material. The covering 11 may be coated with a water blocking material. In an embodiment of the optical cable a micromodule comprising optical waveguides which are encircled by a rigid tube may be used as central element 10. In another configuration the central element of the optical cable comprises a plurality of electrical conductors. The electrical conductors may be a twisted arrangement of two or more metallic wires. The electrical conductors may be used for example to provide a supply voltage to optical receiver or transmitter stations.

The elongate members comprise at least one optical transmission element. The at least one optical transmission element 20 may be formed as a micromodule comprising at least one optical fiber 21 surrounded by a buffer tube 22. Each buffer tube contains for example four to twelve optical fibers. The buffer tube 22 is made of a soft material to allow an easy tearing off the tube to get access to the optical fibers 21 housed therein. The thickness of the buffer tube 22 is selected between 80 μm and 120 μm which allows that the optical fibers may be exposed to connect them with a transmitter or receiver device without using any special tools. In an embodiment of the optical cable illustrated in FIG. 1 the micromodules 20 are free of a gel or grease such that subsequent cleaning steps after exposing the fibers are avoided.

The material composition of the buffer tube 22 has a tension at break of less than 7.5 MPa to allow an easy tearing off the buffer tube. The material composition of the buffer tube may be chosen such that the tension at break of the material is between 5.6 MPa to 6.8 MPa. The tension at break is determined by stretching the buffer tube 22 after having removed the optical fibers 21 until a break of the tube 22 occurs. Furthermore, the composition of the material of the buffer tube is selected such that the elongation at break is in a range between 120% to 160%. The elongation at break of the material of the buffer tube is measured by tearing the empty buffer tube and determining the elongation before the tube breaks. The measurement of the tension at break and the measurement of the elongation at break are taken at room ambient temperature of about 20° C. by using a buffer tube having a thickness of 100 μm.

A material having the above-mentioned characteristics in relation to the tension at break and the elongation at break of the buffer tube comprises at least one or more of ethylene methyl acrylate, a material having flame retardant properties and a thermoplastic material. The flame retardant material may comprise at least one or more of aluminium hydroxide and magnesium hydroxide. A thermoplastic material may be a polyethylene, such as a LLDPE (linear low density polyethylene). An exemplary composition of materials contains for example a mixture of 50% of ethylene methyl acrylate, 30% of magnesium hydroxide or aluminium hydroxide and 10% of polyethylene.

The portion of the inorganic material determines the elongation at break. If the ratio of polyethylene is increased and the portion of mass of magnesium hydroxide is decreased the material composition becomes more ductile. If the proportion of mass of the polyethylene material is decreased in the total mass of the material composition of the buffer tube and the proportion of mass of magnesium hydroxide or aluminium hydroxide is increased, the material of the buffer tube has a reduced elongation at break such that the material can easily removed by an installer person to expose the optical fibers. If the mass ratio of the thermoplastic polymer is increased, or if the polyethylene material is replaced by PBT (polybutylene terephtalate) or PP (polyprophylene) the material of the buffer tube becomes more rigid.

The elongate members 20 are stranded around the central element 10 e.g. in an SZ stranding pattern. In case of an SZ stranding the elongate members 22 are wound in a first direction around the central structural element 10 for several turns and then are wound around the central structural element 10 for several turns in the opposite direction. The buffer tubes are stranded around the central element 10 by a lay length between 60 mm and 120 mm. A typical lay length is about 80 mm.

Figure 2:
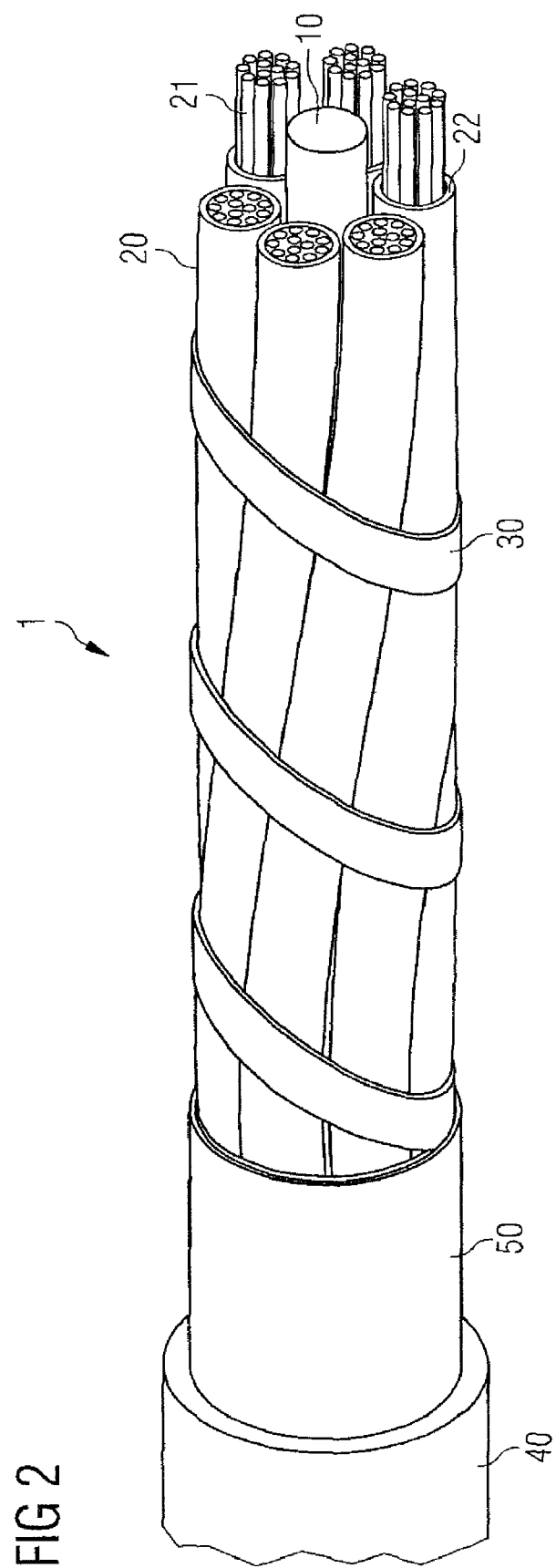
FIG. 2 shows an embodiment of an optical cable comprising stranded micromodules in a perspective view.

FIG. 2 shows a perspective view of the optical cable 1 comprising the central element 10, elongate members 20 formed as optical transmission elements including optical fibers 21 housed by a buffer tube 22. The elongate members 20 are bound together with a binder 30 to avoid an unwinding of the stranded elongate members. The binder is helically wound around the elongated members which are for example arranged in a SZ stranding.

In order to prevent a migration of moisture along the optical transmission elements the binder is coated with a water swellable material. The binder may be a yarn made of polyester which is for example coated with a water swellable powder composition such as a SAP (super absorbent polymer) powder. Due to the soft material of the buffer tubes 22 of the optical transmission elements 20 the binder 30 is wound around the optical transmission elements such that the binder does not affect the performance of the fibers. The binder is wrapped with a low tension so that no remarkable deformation of any of the buffer tubes occurs. Therefore, the binder is wrapped around the optical transmission elements by controlling the tensile force of the binder when the binder is drawn off from a supply coil of a spinner. The wrapping process of the binder is such that the tension effected to the binder does not exceed a threshold value of the tension. A suitable tension is less than 2.5 N to prevent an increase of attenuation when light is transmitted via the optical fibers enveloped by the buffer tube. The tension of the binder may be controlled by the spinner to be in a range between 0.8 N and 1.2 N.

The binder may be formed as a tape made of polyester having a width between 1.0 and 3.0 mm. The use of a wide tape allows that the tension of the binder distributes in a large area of the elongate members. If the elongate members are formed as optical transmission elements the wide supporting area of the binder diminishes the risk of straining the optical fibers housed in each of the buffer tubes.

As illustrated in FIG. 2, the binder is wound around the optical transmission elements by a lay length which is smaller than the lay length of the elongate members 20. The lay length of the binder may be 20 mm to 30 mm which is about twice to four times the lay length of the elongate members 20 to hold the stranded elongate members in place against the central element 10.

An outer sheath 40 is disposed around the optical transmission elements 20. The material of the sheath may be a HDPE (high density polyethylene) or a polyamide. The material of HDPE is suited to be manufactured by low temperature steps below of about 190° C. Due to the low friction of the HDPE material the material of HDPE and polyamide allows to easily blow-in the optical cable 1 in a microduct. The material of the sheath 40 may be disposed around the optical transmission elements by an extrusion process with a thickness between 0.5 mm and 0.6 mm.

The embodiment of the optical cable shown in FIG. 1 and FIG. 2 shows a tape 50 made of polyester or paper which is disposed between the stranded optical transmission elements 20 and the outer sheath 40. The tape 50 is used as a thermal barrier layer and prevents the soft buffer tubes 22 of the optical transmission elements 20 from sticking together when the material of the outer sheath 40 is extruded. The tape 50 may contain a water swellable powder such as a composition comprising a mixture of polyacrylate water swellable particles. The tape has for example a thickness between 40 μm and 60 μm.

The optical cable 1 may comprise six optical transmission elements 20 having for example a diameter of 1.3 mm which are stranded around the central element 10 made of a GRP rod also having a diameter of 1.3 mm. If each of the optical transmission elements 20 includes twelve optical fibers 21 the optical cable may be manufactured with a diameter of 5.4 mm. The buffer tubes may also contain less optical fibers. An optical cable based on e.g. micromodules with a diameter of 1.0 mm and comprising eight optical fibers may be manufactured with an overall diameter of 4.5 mm. Optical cables including micromodules 20 having a diameter of 0.9 mm with six optical fibers housed therein have an overall diameter of 4.2 mm, and micromodules having a diameter of 0.8 mm containing four optical fibers may be manufactured with an overall diameter of 3.9 mm.

The optical cable design as shown in FIG. 1 and FIG. 2 combines the stranded cable technology and the micromodule technology. The cable provides sufficient kink resistance to install the cable in microducts by a blowing process. The high kink resistance is caused by the central structural element 10 and the optical transmission elements 20 stranded around the central element 10 by winding a binder around the optical transmission elements to hold the optical transmission elements in place against the central structural element 10. An improved performance in relation to a high kink resistance of the optical cable is achieved if the optical transmission elements 20 are SZ stranded around the central element 10 and the binder is helically wound around the stranded optical transmission elements. The central element 10 and the stranded optical transmission elements 20 provides a tensile strength of the optical cable up to 900 N and an anti buckling capability of the optical cable in an operating window between −20° C. and +60° C.

The soft material of the buffer tube allows an easy access to the optical fibers. The low tension of the binder of less than 2.5 N allows that the binder does not constrict the material of the buffer tube 22 and does not affect the optical transmission elements so that the performance of the optical fibers is maintained. On the other hand, the low tension of the binder is sufficient to hold the optical transmission elements 20 in place against the central element 10.

Figure 3:
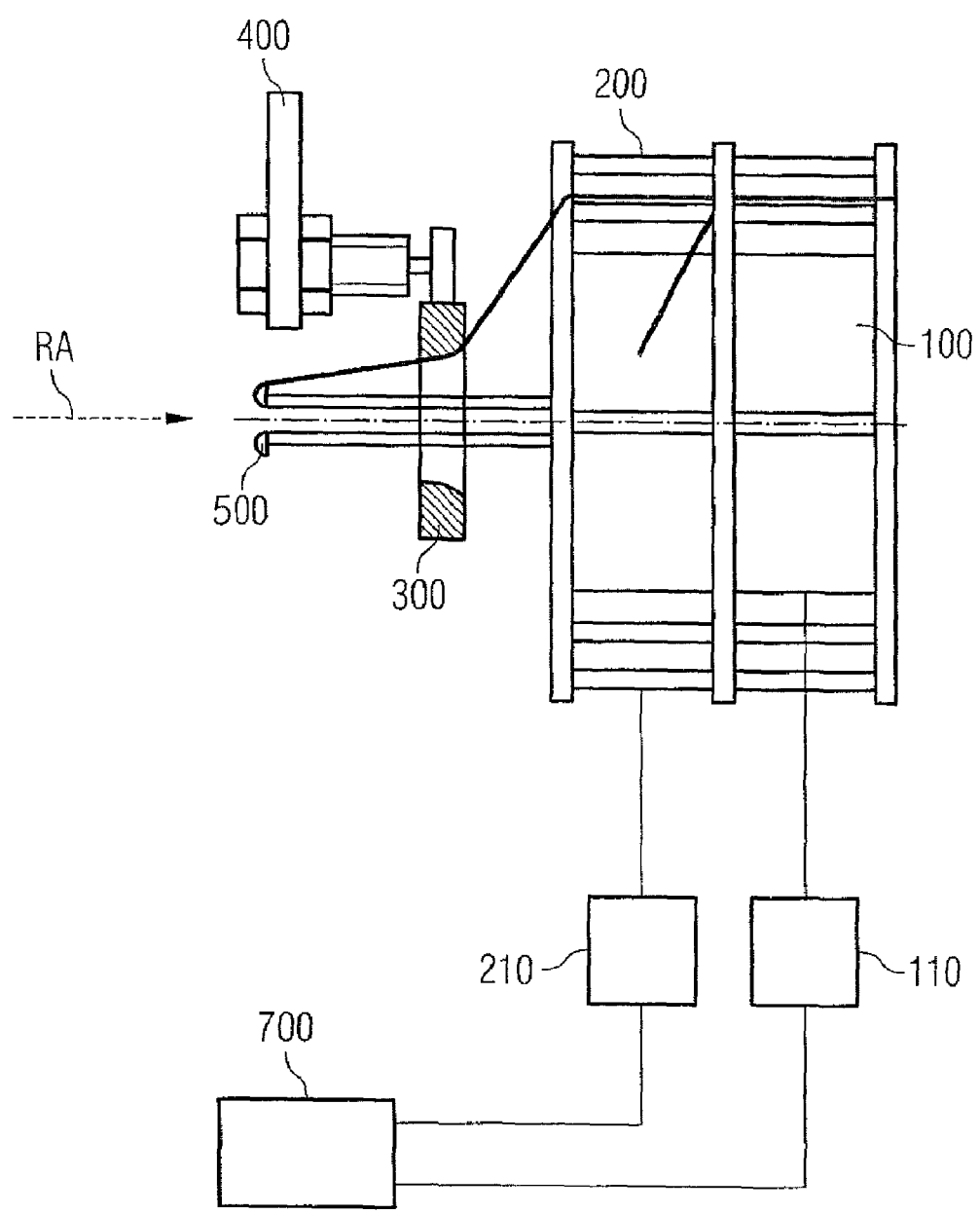
FIG. 3 shows an embodiment of a reverse stranding apparatus.

FIG. 3 shows a stranding apparatus 1000 which is configured to wind a binder 30 around a plurality of elongate members disposed around a central element with a low tension less than 2.5 N and preferably between 0.8 N and 1.2 N. The stranding apparatus of FIG. 3 is a reverse stranding apparatus. The reverse stranding apparatus comprises a supply coil 100 to store the binder 30 such as a retaining spiral, a yarn, a binding thread or the like. The supply coil 100 is configured to be rotatable. The supply coil 100 is surrounded by a cage (flyer) 200 to draw-off the binder from the supply coil. The binder 30 is guided through the opening of a ring sensor 300 to a stranding region. A stranding device 500 such as a stranding nipple is located in the stranding region to wrap the binder 30 around the optical transmission elements. The reverse stranding apparatus comprises the supply coil 100, the flyer 200, the ring sensor 300 and the stranding nipple 500 arranged in a reverse direction in relation to the draw-off direction of the optical cable.

In a rest position in which the measuring probe 300 is not affected by any force, load and tension, the ring sensor is adjusted in a manner free of deflection. If a tensile force becomes effective to the binder the ring sensor 300 is moved out of its rest position. A power sensor 400 is connected to the ring sensor 300 to determine a tensile force of the binder. A rotational speed of the supply coil is controlled in dependence on the determined tensile force.

Since the ring sensor 300 is positioned between the supply coil 100 and the stranding nipple 500, all tensile forces which become effective to the elongate members 20 before the binder 30 reaches the stranding region are taken into account. The ring sensor 300 is coupled to a power sensor 400. The binder 30 is deflected by the sensor ring 300 out of its original draw-off direction. When the tension of the binder changes, a force acts on the sensor ring 300 and is detected by the power sensor 400.

Each of the supply coil 100 and the flyer 200 is driven by an own drive device. As illustrated in FIG. 3 the supply coil 100 is driven by a drive device 110, and the flyer 200 is driven by a drive device 210. The power sensor 400 converts the detected tensile force into electrical signals, which are fed to a control device 700. The control device 700 controls the rotational speed of the supply coil 100 in dependence on the detected tensile force by regulating the rotational speed of the drive device 110. The rotational speed of the flyer is changed by the drive device 220 dependent on the speed of the optical cable transferred through the production line.

The reverse stranding apparatus may be used to strand a binder around elongate members, such as micromodules, to fix the micromodules against a central element. The configuration of the reverse stranding apparatus as illustrated in FIG. 3 allows that manufacturing devices, such as other stranding machines as well as film and tape forming machines can be positioned in the production line before the reverse stranding apparatus.

Figure 4:
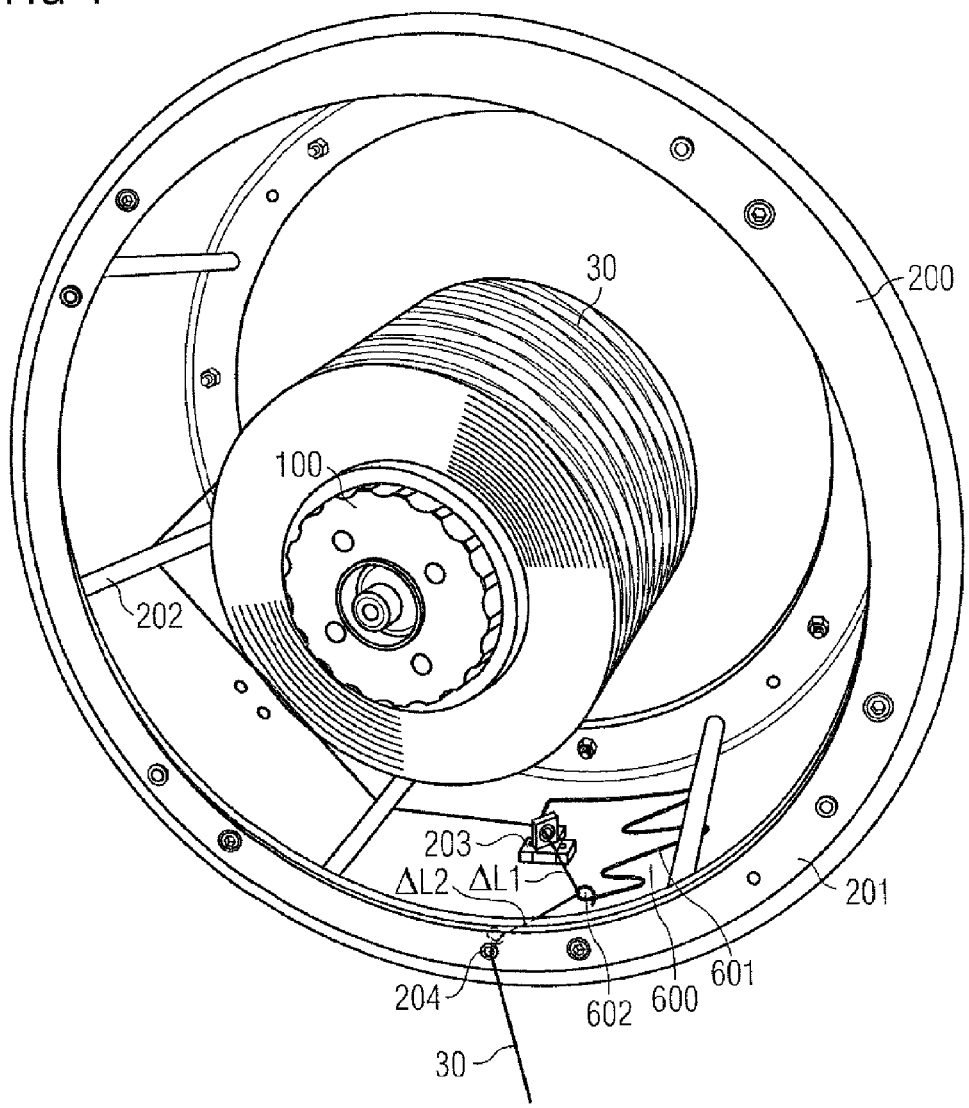
FIG. 4 shows an embodiment of a stranding apparatus comprising a supply coil and a flyer to wrap a binder around stranded micromodules.

FIG. 4 shows the supply coil 100 and the flyer 200 in an enhanced view. The flyer 200 comprises guide disks 201 arranged concentrically in relation to the axis of rotation RA of the flyer/supply coil. Several cross bars 202 extend between the guide disks 201. An eyelet 203 and a spring element 600 are fixed onto the inner surface of the flyer 200. In the configuration of the stranding apparatus shown in FIG. 4, an end of the spring element 600 is fixed to the flyer 200. A wire 601 of the spring element 600 is formed such that the wire is guided from the eyelet 203 in a small distance apart from the inner surface of the flyer in a direction perpendicular to the rotational axis RA of the flyer. In its further run the wire 601 is bent in a Z-shaped form parallel to the rotational axis RA. The other end of the wire is bent in the form of an eyelet 602.

The binder is drawn off from the supply coil 100 and is guided via the cross bars 202 to the eyelet 203. The binder is fed through the eyelet 602 positioned at the end of the spring element 600 and is guided to an opening 204 located in the guide disk 201.

As illustrated in FIG. 4, the binder 30 is guided along the inner surface of the flyer 200 via the eyelet 602 of the spring element 600 along a way which is longer by a path $\Delta L = \Delta L1 + \Delta L2$ than a direct path between the eyelet 203 and the opening 204. If a variation of the tensile force effected to the binder occurs, the spring element 600 exerts a resetting force to the binder 30. The spring element enables that variations of the tensile force, i.e. peaks of the tensile force, becoming effective to the binder during a stranding process are attenuated or completely avoided.

The stranding apparatus allows the stranding apparatus to wrap the binder around elongate members 20 without causing a remarkable deformation of the material of the buffer tube 22. In particular, the stranding apparatus is suited to wind a binder 30 around optical transmission elements 20 comprising a buffer tube made of a soft material, e.g. a material having a tension at break of less than 7.5 MPa, for example having a tension at break in a range between 5.6 MPa to 6.8 MPa and having an elongation at break between 120% and 160%. The binder may be disposed on the optical transmission elements without changing or damaging the surface of the buffer tube. Although the material of the buffer tube is soft, the stranding apparatus allows that the form of the buffer tube is kept unchanged so that the attenuation of the optical fibers housed by the buffer tube does not increase.

The binder may be wound around the optical transmission elements with a tension below 2.5 N. The tensile force effected to the binder is measured by the ring sensor 300. The ring sensor is arranged concentrically with the axis of rotation RA. During the stranding process the binder runs in a circumferential direction along the ring sensor. The tensile forces which become effective to the binder are determined by the power sensor 400 which is connected to the ring sensor 300. The rotational speed of the supply coil 100 is controlled in dependence on the detected tensile force measured by the ring sensor 300 and independent on the elongation of the spring element 600. The rotational speed may also be controlled in dependence on the elongation of the spring element and the tensile force detected by the ring sensor.

The stranding apparatus comprising a combination of a regulation of the rotational speed of the supply coil 100 dependent on the tensile force effected to the binder 30 and an attenuation of peak values of the tensile force by the spring element 600 allows to wind the binder 30 around the elongate members 20 by a tensile force between 0.8 N and 1.2 N.

What is claimed is:

1. An optical cable, comprising:
   a central element;
   a plurality of elongate members disposed around the central element, at least one of the elongate members comprising at least one optical fiber and a buffer tube, the buffer tube surrounding the at least one optical fiber having a tension at break of less than 7.5 MPa;
   a binder wrapped around the plurality of elongate members, wherein the binder is wrapped around the plurality of elongate members with a tension of less than 2.5 N and the plurality of elongate members are stranded around the central element; and
   an outer jacket surrounding the plurality of elongate members.

2. The optical cable of claim 1, wherein the binder comprises a yarn of polyester having a width between 1.0 mm to 3.0 mm.

3. The optical cable of claim 2, wherein the central element comprises at least one of a glass reinforced polymer rod and a metallic wire.

4. The optical cable of claim 3, wherein the diameter of the cable is less than 5.4 mm.

5. The optical cable of claim 1, wherein the binder comprises a yarn of polyester.

6. The optical cable of claim 5, wherein the binder has a width between 1.0 mm and 3.0 mm.

7. The optical cable of claim 1, wherein:
   the elongate members are stranded around the central element with a lay length between 60 mm and 120 mm in an SZ pattern; and
   the binder is helically wound around the elongate members with a lay length between 20 mm and 30 mm.

8. The optical cable of claim 7, wherein the binder comprises a yarn of polyester having a width between 1.0 mm and 3.0 mm.

9. The optical cable of claim 7, wherein the diameter of the cable is less than 5.4 mm.

10. The optical cable of claim 7, wherein a material of the buffer tube comprises at least one of ethylene methyl acrylate, a material having flame retardant properties, and a thermoplastic material, and wherein central element comprises at least one of a glass reinforced polymer rod and a metallic wire.

11. The optical cable of claim 1, wherein a material of the buffer tube comprises at least one of ethylene methyl acrylate, a material having flame retardant properties, and a thermoplastic material.

12. The optical cable of claim 1, wherein the buffer tube has an elongation at break between 120% and 160%.

13. The optical cable of claim 1, wherein the central element comprises at least one of a glass reinforced polymer rod and a metallic wire.

14. The optical cable of claim 1, wherein the buffer tube has a thickness between 80 µm and 120 µm.

15. The optical cable of claim 1, wherein the diameter of the cable is less than 5.4 mm.

16. An optical cable, comprising:

a strength element comprising at least one of a glass reinforced plastic rod and a metallic wire;

a plurality of elongate members disposed around the strength element, at least one of the elongate members comprising at least one optical fiber and a polymer buffer tube, the buffer tube having a tension at break of less than 7.5 MPa and a thickness between 80 μm and 120 μm;

a polyester binder wrapped around the plurality of elongate members and having a width between 1.0 mm to 3.0 mm, wherein the binder is wrapped around the plurality of elongate members with a tension of less than 2.5 N and the plurality of elongate members are stranded around the strength element; and a polymer outer jacket surrounding the plurality of elongate members and having a diameter of less than 5.4 mm.

17. The optical cable of claim 16, wherein:

the elongate members are stranded around the strength element with a lay length between 60 mm and 120 mm in an SZ pattern; and the binder is helically wound around the elongate members with a lay length between 20 mm and 30 mm.

18. The optical cable of claim 16, wherein a material of the buffer tube comprises at least one of ethylene methyl acrylate, a material having flame retardant properties, and a thermoplastic material, and wherein the buffer tube has an elongation at break between 120% and 160%.

19. The optical cable of claim 1, wherein the tension of the binder is greater than 0.5 N.

20. The optical cable of claim 16, wherein the tension of the binder is greater than 0.5 N.

* * * * *